United States Patent Office 3,054,048
Patented Sept. 11, 1962

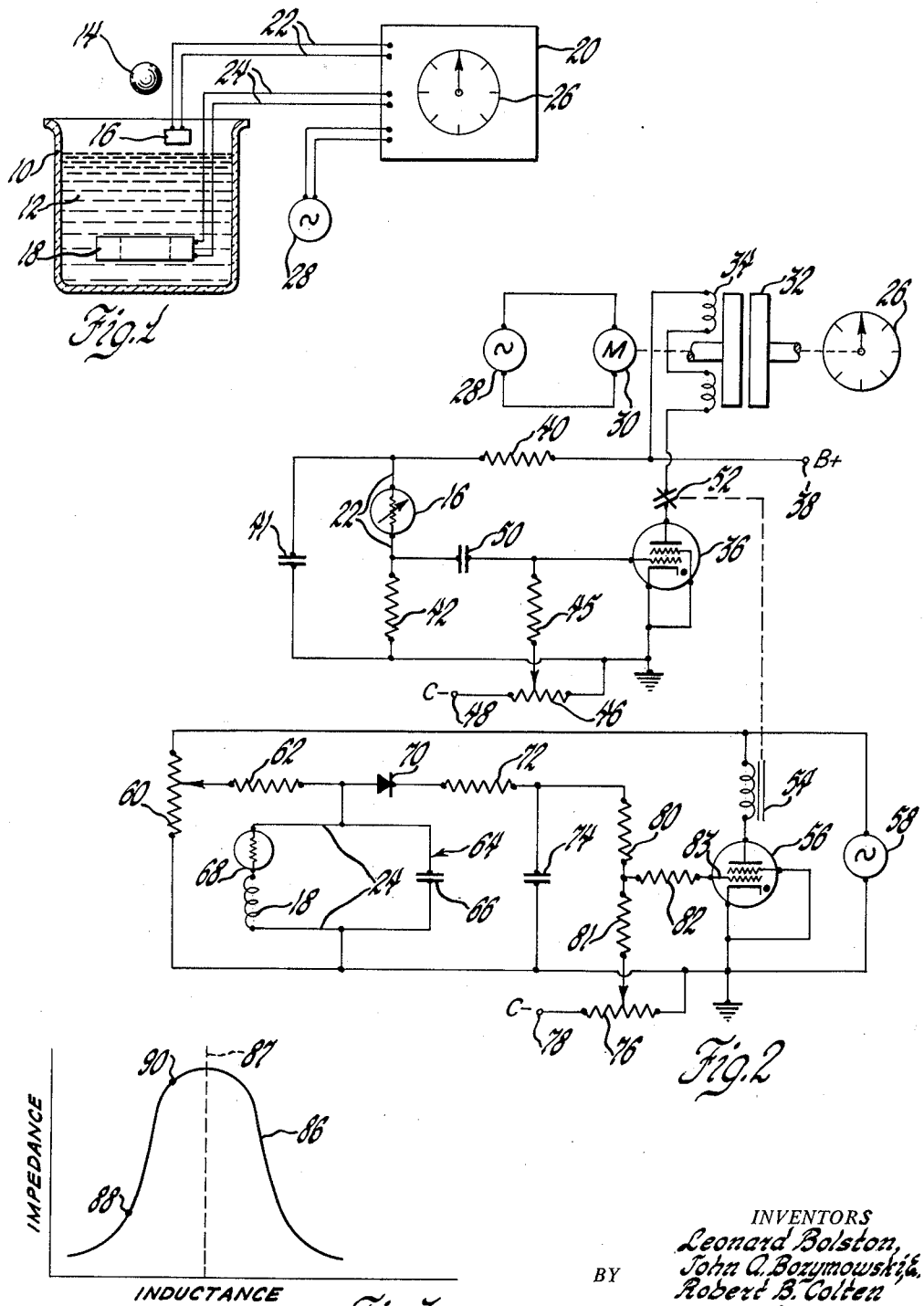

3,054,048
QUENCHING MEDIA EVALUATION CIRCUIT
Leonard Bolston, Mount Clemens, John A. Bozymowski, Warren, and Robert B. Colten, Oak Park, Mich., assignors to General Motors Corporation, Detroit, Mich., a corporation of Delaware
Filed Nov. 6, 1959, Ser. No. 851,311
6 Claims. (Cl. 324—34)

This invention relates to testing apparatus and more particularly to apparatus for evaluating the heat extraction rate of quenching media.

This invention utilizes the principle that a para-magnetic substance becomes non-magnetic at a certain temperature known as the Curie point. This Curie point may be used as a reference temperature in an arrangement for evaluating quenching media. Several methods and apparatus based upon this principle are described in the following co-pending applications which are all assigned to the assignee of the present invention: S.N. 711,485, filed January 27, 1958; S.N. 711,744, filed January 28, 1958, now Patent No. 2,937,334; and S.N. 711,745, filed January 28, 1958, now Patent No. 2,937,335.

In accordance with this invention an electronic circuit is employed for determining the occurrence of the Curie point as a metal specimen changes in temperature. This is accomplished by placing the specimen in the magnetic field of an inductance element to influence the inductance in accordance with the magnetic properties of the specimen. In its non-magnetic state the specimen introduces eddy current losses in the inductance element. When the temperature of the specimen is changed such that the specimen exhibits magnetic properties there is an additional effect of an increase in inductance due to the increased permeability of the magnetic field medium. The inductance element is incorporated in an inductance-capacitance (L-C) circuit and this circuit is energized by an alternating voltage. The values of the inductance element and the associated capacitance in the L-C circuit are such that the circuit is tuned to the area of maximum slope of the resonance curve. Thus, the change in inductance occurring when the specimen reaches the Curie point results in a change of a very large degree in the impedance of the L-C circuit. The characteristic of the impedance presented to the alternating voltage by the L-C circuit may be readily utilized to provide a signal representing the time at which the temperature of the specimen reaches the Curie point.

It is the principal object of this invention to provide apparatus for determining the heat transfer rate of materials. A further object of this invention is to provide apparatus for detecting the occurrence of the Curie point in the temperature of a specimen immersed in quenching media. Another object is to provide a circuit for utilizing the change in magnetic properties of a metallic specimen upon the occurrence of the Curie point for evaluating the characteristics of quenching media.

The novel features that are believed characteristic of this invention are set forth in the appended claims. The invention itself, however, both as to its organization and method of operation together with further objects and advantages thereof, may best be understood with reference to the following description, when read in conjunction with the accompanying drawing, in which:

FIGURE 1 is a diagram of testing apparatus incorporating the invention;

FIGURE 2 is a schematic diagram of the electronic circuit utilized in the invention; and FIGURE 3 is a graphic representation of the characteristics of the inductance-capacitance circuit employed in the invention.

Referring now to the drawing, wherein like reference numerals are used to designate like parts in all figures, and referring more particularly to FIGURE 1, testing apparatus is shown for determining the time required for reducing the temperature of a metallic specimen from a predetermined value to the Curie point. A vessel 10, preferably of non-magnetic material, contains a quenching liquid 12 which may be, for example, mineral oil or high speed quenching oil. The liquid is adapted to quench or quickly reduce the temperature of a metallic specimen 14, which may take the form of a spherical element of nickel having a known Curie point of 665° F. The specimen 14, having been heated to a predetermined temperature such as 1625° F. by external means, is allowed to fall into the quenching liquid 12. A detecting element 16 is positioned near the surface of the liquid to detect the time at which the specimen enters the quenching liquid. An inductance coil 18, positioned to receive the specimen in its magnetic field, is adapted to aid in detecting the time at which the temperature of the specimen 14 reaches the Curie point. A timing device 20 is employed to provide a visual indication of the time required by the quenching liquid to cool the specimen from the predetermined temperature level to the Curie point. The detecting element 16 is connected to the timing device 20 by a pair of conductors 22 and the inductance coil is likewise connected to the timing device by a pair of conductors 24. An elapsed time indicator 26 is included in the timing device 20 to provide a visual indication of elapsed time. The timing device and associated electrical circuitry are energized by a suitable alternating voltage source 28.

The details of the electronic circuitry associated with the timing device 20 are shown in FIGURE 2. A motor 30, energized by the source 28, is adapted to drive the elapsed time indicator 26 through a suitable mechanical linkage. Included in the mechanical linkage between the motor 30 and the indicator 26 is a magnetic clutch 32 which is adapted to be normally disengaged so long as no current is flowing in a coil 34 which forms the field coil of the clutch. The circuit for energizing the coil 34 of the magnetic clutch includes a gas filled tetrode tube 36 which is connected in series with the coil 34. The tube 36 and the coil 34 are connected across a suitable positive voltage source 38 which may conveniently be obtained by rectifying and filtering the input from the source 28.

The circuit for triggering the tube 36 includes the detecting device 16 which preferably takes the form of a photosensitive resistance element that exhibits a decrease in resistance in the presence of infrared radiations from the heated specimen 14. The device 16 is in a voltage divider circuit which is placed between the source 38 and ground. A filter made up of a resistor 40 and a capacitor 41 provides a constant voltage level across the voltage divider. The second element of the voltage divider is a resistor 42 which is of the same order of magnitude as the resistance of the device 16 when no radiations are present. The tube 36 obtains a negative bias voltage through a resistor 45 and a tap on a potentiometer 46 which is connected between a negative voltage source 48 and ground. The negative source 48 may be obtained by rectifying and filtering the input from the source 28. A coupling circuit including a capacitor 50, the resistor 45, and the potentiometer 46 allow rapid changes in the voltage across the resistor 42 to be applied to the grid of the tube 36 but block any relatively slow changes in voltage.

Also included in the plate circuit of the tube 36 are a pair of normally closed relay contacts 52. When actuated, these contacts are adapted to open the plate circuit of the tube and so to terminate conduction of the tube and thus to de-energize the coil 34 of the magnetic clutch 32. The contacts 52 are actuated by a relay coil 54 which is in the plate circuit of a second gas-filled tetrode tube 56. An alternating voltage source 58, which may be the same as the source 28, is connected to energize the coil 54 and the tube 56. Also connected across the voltage source 58 is a potentiometer 60 which, in conjunction with a resistor 62 and an L-C circuit 64, form a voltage divider network. The L-C circuit 64 includes the inductance coil 18 and a capacitor 66 which have reactance values such that the L-C circuit is tuned to a point near resonance with respect to the frequency of the alternating voltage source 58. A thermistor 68 is connected in series with the inductance coil 18 and is positioned such that its temperature will be the same as that of the quenching liquid 12 to compensate for changes in the resistance in the inductance coil 18 due to changes in the temperature of the quenching liquid. A series circuit including a diode 70, a resistor 72 and a capacitor 74 is connected across the L-C circuit 64 for the purpose of rectifying, filtering, and providing a positive voltage that is a function of the drop across this circuit 64.

A negative biasing potential for the tube 56 and the diode 70 is obtained from a potentiometer 76 which is connected between a negative voltage source 78 and ground. The source 78 may be the same as the source 48. A network of resistors 80, 81, and 82 applies a negative bias voltage to a control grid 83 of the tube 56 so that the tube is normally non-conductive, and this network also applies a portion of the positive voltage appearing across the capacitor 74 to the grid 83.

In FIGURE 3, the graph 86 is a plot of the impedance presented by the L-C circuit 64 as a function of the inductance of the coil 18. The graph 86 is a resonance curve and is centered about a line 87 which represents a condition wherein the inductive reactance of the coil 18 is equal in magnitude to the capacitive reactance of the capacitor 66. Since the resonance curve is fairly broad the L-C circuit 64 is tuned to operate in the region of maximum slope which is somewhat off center and results in a very large change in impedance for a relatively small change in inductance. In the absence of the specimen 14 in the magnetic field of the coil 18, the impedance presented by the L-C circuit 64 is relatively low, corresponding to a point 88 on the graph 86. When the specimen is within the magnetic field but has a temperature above the Curie point, the impedance does not depart appreciably from this point 88. When the specimen, while in the magnetic field of the inductor 18, changes to its magnetic state, the impedance presented by the circuit 64 increases to a high value corresponding to a point 90 on the graph.

In the operation of this system the heated specimen 14 gives off infrared radiation and causes the resistance of the detecting device 16 to decrease at the time when the specimen enters the quenching liquid 12. This results in an increase in the voltage drop across the resistor 42 and a positive-going voltage pulse is coupled to the grid of the tube 36. This causes the tube 36 to conduct which energizes the coil 34 of the magnetic clutch 32. The motor 30 then begins to drive the hand on the elapsed time indicator 26. The tube 36 continues to conduct even after its grid voltage returns to the steady state level so long as the contacts 52 remain closed due to the conventional characteristics of gas tubes or thyratrons.

When the specimen 14 enters the quenching media 12 it may be within the magnetic field of the inductance coil 18 but so long as its temperature is above the Curie point the impedance of the L-C circuit 64 will not depart appreciably from the magnitude represented by the point 88 on the graph 86. When the Curie point is reached the impedance of the L-C circuit will increase to a value such as that represented by the point 90 on the curve. This will result in a relatively large alternating voltage drop across the L-C circuit 64 which will charge the capacitor 74 on positive half cycles of the input provided by the alternating voltage source 58. This will overcome the negative bias on the grid 83 and the tube 56 will begin to conduct, energizing the relay coil 54. The contacts 52 will then open and in doing so will de-energize the coil 34 to disengage the magnetic clutch 32 and stop the movement of the hand on the elapsed time indicator 26. Thus the reading on the elapsed time indicator will be the time required by the quenching liquid 12 to decrease the temperature of the specimen 14 from a known level to the Curie point.

Due to the fact that the gas-filled tube 56 is energized by an alternating voltage source, the system will reset itself when the specimen 14 is removed from the area of the inductance coil 18 and the voltage drop across the L-C circuit 64 decreases. The tube 56 will cease conducting, allowing the contacts 52 to close. Since the resistance of the detecting device 16 returns to its normal value in the absence of infrared radiation, the negative grid bias causes the tube 36 to remain in its non-conductive state after the contacts 52 are closed. If the hand on the elapsed time indicator is reset to zero, the apparatus may be immediately utilized for another test.

While there has been illustrated a particular embodiment of the invention, it will be understood that the invention is not limited thereto since various modifications may be made and it is contemplated by the appended claims to cover any such modifications as fall within the true spirit and scope of the invention.

What we claim as our invention is:

1. In an instrument for measuring the elapsed time required by quenching media to change the temperature of a specimen from a predetermined value to the Curie point, the combination of first detecing means responsive to the entry of the specimen into the quenching media, an elapsed time indicating device connected to be actuated by said first detecting means and adapted to initiate a timing cycle when said specimen enters said quenching media, and second detecting means responsive to the change in magnetic characteristics of said specimen when the Curie point is reached, said second detecting means comprising a source of alternating voltage, a voltage divider connected across said source of alternating voltage, an inductance-capacitance circuit included as one of the impedances of said voltage divider, an inductance coil connected in said circuit and adapted to receive said specimen within its magnetic field to influence the inductance thereof whereby the impedance presented by said circuit to said alternating voltage will be of a first value when said specimen is of a temperature above the Curie point and will be of a second value substantially differing from said first value when said specimen regains its magnetic properties upon reaching the Curie point, and trigger means responsive to the voltage drop across said circuit and connected to said elapsed time indicating device and adapted to terminate said timing cycle when said specimen reaches the Curie point.

2. In an instrument for measuring the elapsed time required by quenching media to change the temperature of a specimen from a predetermined value of the Curie point, the combination of first detecting means responsive to the entry of the specimen into the quenching media, an elapsed time indicating device, control means connected to be actuated by said first detecting means and adapted to initiate a timing cycle on said elapsed time indicating device when said specimen enters said quenching media, second detecting means responsive to the change in magnetic characteristics of said specimen when the Curie point is reached, said second detecting means comprising a source of alternating voltage, a voltage divider connected across said source of alternating voltage, a parallel inductance-capacitance circuit included as one of the impedances of said voltage divider, an inductance coil connected in said parallel circuit and adapted to receive said specimen within its magnetic field to influence the inductance thereof whereby the impedance presented by said parallel circuit to said alternating voltage will be of a value substantially different from the resonant impedance before the temperature of said specimen reaches the Curie point and will be of a value substantially equal to the resonant impedance when said specimen regains its magnetic properties upon reaching the Curie point, and trigger means responsive to the voltage drop across said parallel circuit and connected to operate said control means whereby said elapsed time indicating device is effective to terminate said timing cycle when said specimen reaches the Curie point.

3. Apparatus according to claim 2 wherein said first detecting means comprises a temperature sensitive resistor and means responsive to the voltage drop across said resistor for actuating said control means.

4. Apparatus according to claim 2 wherein said trigger means comprises a thyratron having a plate-cathode circuit connected across said source of alternating voltage and having a control grid coupled to said inductance-capacitance circuit.

5. In an instrument for measuring the elapsed time required by a fluid to change the temperature of a specimen from a predetermined value to the Curie point, the combination of first detecting means responsive to the entry of the specimen into the fluid, an elapsed time indicating device connected to be actuated by said first detecting means and adapted to initiate a timing cycle when said specimen enters said fluid, and second detecting means responsive to the change in magnetic characteristics of said specimen when the Curie point is reached, said second detecting means comprising a source of alternating voltage and an inductance capacitance circuit connected in series, an inductance coil included in said inductance-capacitance circuit and adapted to receive said specimen within its magnetic field to influence the inductance thereof whereby the impedance presented by said inductance-capacitance circuit to said alternating voltage will be of a first value when said specimen is of a temperature above the Curie point and will be of a second value substantially differing from said first value when said specimen regains its magnetic properties upon reaching the Curie point, and trigger means responsive to the voltage drop across said inductance-capacitance circuit and connected to said elapsed time indicating device and adapted to terminate said timing cycle when said specimen reaches the Curie point.

6. In an instrument for measuring the elapsed time required by a fluid to change the temperature of a specimen from a predetermined value to the Curie point, the combination of first detecting means responsive to the entry of the specimen into the fluid, an elapsed time indicating device, control means connected to be actuated by said first detecting means and adapted to initiate a timing cycle on said elapsed time indicating device when said specimen enters said fluid, second detecting means responsive to the change in magnetic characteristics of said specimen when the Curie point is reached, said second detecting means comprising a source of alternating voltage and a parallel inductance-capacitance circuit connected in series, an inductance coil connected in said parallel circuit and adapted to receive said specimen within its magnetic field to influence the inductance thereof whereby the impedance presented by said parallel circuit to said alternating voltage will be of a value substantially different from the resonant impedance before the temperature of said specimen reaches the Curie point and will be of a value substantially equal to the resonant impedance when said specimen regains its magnetic properties upon reaching the Curie point, and trigger means responsive to the voltage drop across said parallel circuit and connected to operate said control means whereby said elapsed time indicating device is effective to terminate said timing cycle when said specimen reaches the Curie point.

References Cited in the file of this patent

UNITED STATES PATENTS

| 1,779,604 | Knerr | Oct. 28, 1930 |
| 2,324,525 | Mittelmann | July 20, 1943 |

FOREIGN PATENTS

| 390,178 | Great Britain | Mar. 30, 1933 |